United States Patent [19]

Connolly et al.

[11] Patent Number: 4,482,616

[45] Date of Patent: Nov. 13, 1984

[54] CONTROLLING SOLUBILITY OF LITHIUM SALTS IN LIQUID SULFUR DIOXIDE

[75] Inventors: John F. Connolly, Glen Ellyn; Robert J. Thrash, Carol Stream, both of Ill.

[73] Assignee: Standard Oil Company (Indiana), Chicago, Ill.

[21] Appl. No.: 508,524

[22] Filed: Jun. 27, 1983

[51] Int. Cl.$^3$ ............................................. H01M 6/14
[52] U.S. Cl. ..................................... 429/101; 429/188; 429/194; 429/197; 429/201
[58] Field of Search ............... 429/101, 105, 188, 189, 429/194, 197, 199, 201, 212, 46

[56] References Cited

U.S. PATENT DOCUMENTS

| | | |
|---|---|---|
| 3,511,716 | 5/1970 | Gabano et al. ...................... 429/197 |
| 3,551,205 | 12/1970 | Fraioli et al. ........................ 429/217 |
| 3,567,515 | 3/1971 | Maricle et al. ................. 429/197 X |
| 3,891,458 | 6/1975 | Eisenberg ............................ 429/197 |
| 4,119,767 | 10/1978 | Beck et al. ...................... 429/106 X |
| 4,139,680 | 2/1979 | Schlaikjer ....................... 429/196 X |
| 4,246,327 | 1/1981 | Skarstad ......................... 429/194 X |
| 4,252,876 | 2/1981 | Koch ................................... 429/197 |

*Primary Examiner*—Anthony Skapars
*Attorney, Agent, or Firm*—Richard A. Kretchmer; William T. McClain; William H. Magidson

[57] ABSTRACT

The solubility of lithium salts in sulfur dioxide-based solvent systems is enhanced and controlled by the presence of a salt which contains a cation selected from the group consisting of metal cation complexes, quaternary ammonium cations and organic phosphonium cations.

20 Claims, No Drawings

CONTROLLING SOLUBILITY OF LITHIUM SALTS IN LIQUID SULFUR DIOXIDE

BACKGROUND OF THE INVENTION

1. Field of the Invention

This invention relates to a method for enhancing and controlling the solubility of a lithium salt in liquid sulfur dioxide. More particularly, it relates to a method for increasing the solubility of lithium salts in a sulfur-dioxide based solvent system which involves the addition of a solubility enhancing additive comprising a salt which contains at least one cation selected from the group consisting of metal cation complexes, quaternary ammonium cations and organic phosphonium cations.

2. Description of the Prior Art

Recently much effort has been expended in the development of ambient temperature, high energy density cell systems which provide both higher voltages and total capacity (volumetric and gravimetric) than those of the Leclanche or alkaline cells having zinc anodes. The high energy density cell systems are centered around the use of active metals (metals above hydrogen in the EMF series which are unstable in aqueous environments) as anodes in non-aqueous solution cells. As used herein, "non-aqueous" is intended to mean substantially anhydrous.

High energy output and low weight requires the use of active metals as the electrodes and, in particular active metals having low equivalent weights. The alkali metals qualify in these respects. However, since the alkali metals are generally reactive in electrolyte systems containing water, acids, alcohols, or other proton donating solvents, these liquids must be replaced by solvents incapable of undergoing protolytic reactions with such metals. A continuing problem in the choice of such solvents is the tendency to co-reduction of said solvents during the reduction of alkali metal ions to free metal. Thus, it is apparent that not only must the solvent be miscible with, and promote the electrical conductivity of, the supporting electrolyte salt, but it must also remain substantially chemically inert to the electrodes and electrolyte during storage as well as during operation of the electrochemical system. In like manner, the electrolyte must be chemically inert with respect to the electrodes.

Various cell systems have been developed utilizing lithium as the anode electrode material. The ones showing promise in terms of voltage stability and high discharge capability are those having fluid cathode depolarizers which also generally serve the function of supporting electrolyte salt solvent. When a cell of this type is not being discharged, the fluid depolarizer/supporting electrolyte solution reacts with the anode metal to a limited extent with a protective film coating being formed on the surface of the anode. Full reaction between the anode and fluid depolarizer with which it is in contact is thereby substantially prevented and cell self-discharge is limited.

To date, active metal battery art has uniformly emphasized the necessity for soluble anode products and insoluble cathode products during discharge, and the concomitant need to facilitate anodic (active metal) ion transport through the electrolyte to the cathode or positive electrode current collector. As recognized in the art, such systems employ anodes which are termed electrodes of the first kind. These are understood to be electrodes in which the potential determining ion in solution is not in equilibrium with a solid salt phase. Such cells are characterized by cell solutions which are unsaturated in the electrode (or potential determining) ion—allowing the concentration of the potential determining ion to be varied at will. As used in the art, such cells are further characterized by (a) very high (although less than saturated) concentrations of the anode ion; (b) soluble discharge products at the anode; and (c) high ion transfer in solution from anode to positive electrode.

For example, Gabano, (U.S. Pat. No. 3,511,716) discloses a cell in which oxidized lithium goes into solution during discharge and migrates toward the positive electrode. Gabano emphasizes that the solubility of lithium in the solution must be as high as possible to achieve adequate transfer of lithium ions to the positive electrode. Similarly, Skarstad et al. (U.S. Pat. No. 4,246,327) discusses $SO_2$ and $SOCl_2$ based batteries which make use of lithium ion transport and deposit lithium salts as insoluble discharge products on a high surface area cathode.

More specifically, the art has taught that soluble anode products coupled with insoluble cathode products are required and necessary in active metal secondary batteries. Maricle et al. (U.S. Pat. No. 3,567,515) for example, simply state "As a general rule, insoluble [cathode] products are obtained when alkali-metal electrolytes are employed . . . ". In addition, Maricle et al. expressly teach that soluble cathode products are not preferred, especially in secondary batteries.

An even more sweeping generalization is found in Eisenberg, "Study of the Secondary lithium Electrode in Organic Electrolyte", Final Report on LBL Subcontract 4507210, April 1981. Eisenberg teaches (at page 19) that, for a lithium anode in organic, aprotic electrolyte systems, high solubility of lithium ion salts is necessary to provide for the necessary ionic transport through the electrolyte. In such systems, Eisenberg concludes that " . . . the solubility of the lithium anode product in the electrolyte appears to be an unavoidable *fact of life.*" (emphasis in original).

Though the art has thus concentrated exclusively upon active metal anodes of the first kind, the hoped-for advantages of greater conversion of the active metal, higher effective current density and improved low temperature behavior have not been practically realized. Instead, a range of problems has plagued virtually all systems employing an active metal anode of the first kind. One such problem results from difficulties in obtaining requisite ionic transport to and from each electrode. During each charging operation, the active material must be transported from within the solution to the surface of the anode base plate. On the other hand, during each discharge the deposited layers must be completely redissolved. Maintaining uniform current distribution and adequate convection in the electrolyte is thus very important with this type of battery. If uniformity of current distribution is inadequate, several problems arise:

1. Local problems: formation of dendrites and nodules on the surface of the anode;
2. Asymmetrical deposition of the active materials along the electrode surface (shape change); and
3. Asymmetrical deposition of active materials in the positive electrode.

Additional problems arise from the partially irreversible behavior of the active deposits. As a result of the asymmetry between current efficiencies for deposition and dissolution, and as a result of asymmetry in respect of corrosion processes, the active deposits show a partially irreversible behavior. Dendrite formation in cells with anodes of the first kind and the attendant problems are discussed in Beck et al. (U.S. Pat. No. 4,119,767), by Koch (U.S. Pat. No. 4,252,876), and by Schlaikjer (U.S. Pat. No. 4,139,680). Beck et al. and Koch also encountered shape change or morphology problems. The disadvantages of irreversible asymmetrical deposits clogging the cathode are discussed by Beck et al., Fraioli et al. (U.S. Pat. No. 3,551,205) and Maricle et al.

In general, attempts to solve such problems associated with an active metal anode of the first kind have centered on (1) electrolyte-solvent combinations such as those taught by Gabano et al.; Skarstad et al.; and Eisenberg (U.S. Pat. No. 3,891,458, reissued as Res. No. 30,661); (2) additives to help dendrite dissolution such as the teachings of Beck et al.; and (3) high surface area cathodes such as those discussed by Maricle et al. and Fraioli et al.

To the best of our knowledge, no complete solution to the difficulties inherent in active metal anodes of the first kind has yet been found. This failure has prevented the development of an active metal secondary battery which is lightweight, provides stable voltage at open circuit, is operable at ambient temperatures, has large energy density, and can be reliably cycled through numerous charge/discharge cycles. A need exists for a secondary battery with the desirable characteristics expected of an active metal-based electrochemical cell, but without the present disadvantages.

SUMMARY OF THE INVENTION

The present invention is directed to the discovery of a method for increasing the solubility of lithium salts in a sulfur dioxide-based solvent system which involves the addition of a solubility enhancing additive comprising a salt which contains at least one cation selected from the group consisting of metal cation complexes, quaternary ammonium cations and organic phosphonium cations.

One embodiment of the invention is a method for modifying the solubility of a lithium salt in a non-aqueous solvent system which comprises dissolving said lithium salt and a solubility modifying additive in the solvent system, wherein said solvent system comprises a major portion of sulfur dioxide, the amount of said lithium salt is in excess of the amount which is soluble in the solvent system in the absence of said solubility modifying additive, the amount of said solubility modifying additive is effective to increase the solubility of the lithium salt, and said solubility modifying additive comprises a salt which contains at least one cation selected from the group consisting of metal cation complexes, quaternary ammonium cations and organic phosphonium cations.

Another embodiment of the invention is the composition prepared by the process which comprises dissolving a lithium salt and a solubility modifying additive in a non-aqueous solvent system, wherein said solvent system comprises a major portion of sulfur dioxide, the amount of said lithium salt is in excess of the amount which is soluble in the solvent system in the absence of said solubility modifying additive, the amount of said solubility modifying additive is effective to increase the solubility of the lithium salt, and said solubility modifying additive comprises a salt which contains at least one cation selected from the group consisting of metal cation complexes, quaternary ammonium cations and organic phosphonium cations.

A further embodiment of the invention is an electrochemical cell comprising: (a) a lithium anode; (b) a positive electrode current collector; and (c) an electrolyte which comprises the above-described composition.

An object of this invention is to provide a method for controlling the solubility of lithium salts in liquid sulfur dioxide.

Another object of this invention is to provide an improved electrolyte for use in primary and secondary electrochemical cells which utilize lithium electrodes.

Another object of this invention is to provide an improved rechargeable, non-aqueous, ambient temperature electrochemical cell which utilizes a lithium electrode.

A further object of this invention is to provide a method for control of the lithium salt concentration in a sulfur dioxide based electrolyte solution for use in an electrochemical cell having a lithium electrode.

DETAILED DESCRIPTION OF THE INVENTION

We have found that the solubility of lithium salts in a sulfur dioxide-based solvent system can be enhanced in a controlled manner and over a broad range through the addition of a solubility enhancing additive which comprises a salt containing at least one cation selected from the group consisting of metal cation complexes, quaternary ammonium cations and organic phosphonium cations.

In the practice of this invention, a liquid non-aqueous solvent system is used which comprises a major portion of sulfur dioxide. Suitable solvent systems include substantially pure liquid sulfur dioxide and mixtures which consist of a minor portion of one or more cosolvents in combination with a major portion of sulfur dioxide. However, the use of substantially pure sulfur dioxide is generally preferred.

Suitable cosolvents which can be combined with sulfur dioxide in the practice of this invention are liquid organic and inorganic compounds which lack acidic hydrogen atoms and contain one or more atoms having at least one unshared pair of electrons. For the purposes hereof, "acidic hydrogen atoms" are those which are capable of being abstracted by lithium metal. However, strongly basic cosolvents such as amines are not generally desirable.

More specifically, suitable cosolvents are organic or inorganic liquids which contain at least one element which is selected from Groups 3a, 4a, 5a and 6a of the Periodic Table [Handbook of Chemistry and Physics, 57th ed. (1976-77), p. B-4]. Preferred elements from this group include, for example, boron, silicon, nitrogen, phosphorus, oxygen and sulfur as well as combinations of these elements. Organic solvents which contain two or more atoms of such elements in each molecule are particularly suitable.

Preferred liquid organic compounds for use as a cosolvent in the practice of this invention include, but are not limited to, trialkyl borates, boronic acid esters, borinic acid esters, tetraalkyl silicates, alkylalkoxyl silanes, nitroalkanes, alkylnitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites, and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxyethane, 2,2-dimethyoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol, dimethyl ether, acetic anhydride, dimethyl sulfate, dimethyl sulfite, ethylene sulfite, and tetramethylene sulfone.

Preferred liquid inorganic compounds for use as cosolvents in the practice of this invention include, but are not limited to, phosphorus oxychloride, thionyl chloride and sulfuryl chloride. Thionyl chloride is particularly preferred.

The solubility modifying additive for use in the practice of this invention comprises one or more salts which contain at least one cation selected from the group consisting of metal cation complexes, quaternary ammonium cations and organic phosphonium cations. Preferred solubility modifying additives contain at least one anion selected from the group consisting of perchlorate, tetrafluoroborate, hexafluorophosphate, dithionite, sulfate, phosphate, chloride, bromide, iodide and fluoride. Preferred metal cation complexes are metal cations which are associated with one or more organic ligands or chelating agents. It will be appreciated, of course, that such coordinated or chelated metal cations should be free of acidic hydrogen atoms. Examples of suitable metal cation complexes include, but are not limited to, complexes of an alkali metal cation with a crown ether, such as Na(15-crown-5)+ complexes of an alkali metal cation with a cryptand, such as K(C$_{18}$H$_{36}$N$_2$O$_6$)+, [Co(8-hydroxyquinoline)$_2$(NH$_3$)$_2$]+, [Co(8-hydroxyquinoline)$_2$(2,2'-dipyridyl)]+, Mn(2,2'-dipyridyl)$_3$++, and Mn(1,10-phenanthroline)$_3$++. Of these examples, Mn(2,2'-dipyridyl)$_3$++ and Mn(1,10-phenanthroline)$_3$++ are particularly preferred.

Quaternary ammonium salts are highly suitable for use as the solubility modifying additive in the practice of this invention. Preferred quaternary ammonium salts are of the formula:

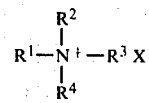

wherein R$^1$, R$^2$, R$^3$ and R$^4$ are independently selected from the group consisting of hydrocarbyl groups containing from 1 to 20 carbon atoms, and X$^-$ is selected from the group consisting of perchlorate, tetrafluoroborate, hexafluorophosphate, dithionite, sulfate, phosphate, chloride, bromide, iodide and fluoride. More preferably, R$^1$, R$^2$, R$^3$ and R$^4$ are independently selected from the group consisting of alkyl groups having from 1 to 10 carbon atoms, and X$^-$ is selected from the group consisting of perchlorate, tetrafluoroborate, hexafluorophosphate, dithionite and sulfate. Examples of suitable quaternary ammonium salts include tetrabutylammonium perchlorate, tetrahexylammonium perchlorate, tetramethylammonium tetrafluoroborate, and tetrapropylammonium hexafluorophosphate.

Phosphonium salts which are suitable for use as the solubility modifying additive in the practice of this invention are of the formula:

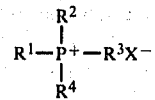

wherein R$^1$, R$^2$, R$^3$ and R$^4$ are independently selected from the group consisting of hydrocarbyl groups containing from 1 to 20 carbon atoms, and X$^-$ is selected from the group consisting of perchlorate, tetrafluoroborate, hexafluorophosphate, dithionite, sulfate, phosphate, chloride, bromide, iodide and fluoride. More preferably, R$^1$, R$^2$, R$^3$ and R$^4$ are independently selected from the group consisting of alkyl groups of from 1 to 10 carbon atoms, and aryl and alkyl-substituted aryl groups of from 6 to 12 carbon atoms; and X$^-$ is selected from the group consisting of perchlorate, tetrafluoroborate, hexafluorophosphate, dithionite and sulfate. Examples of suitable phosphonium salts include tetrabutylphosphonium tetrafluoroborate, tetraphenylphosphonium perchlorate, and tetraphenylphosphonium hexafluorophosphate.

The solubility modifying additive of this invention desirably has a solubility in the sulfur dioxide based solvent system of this invention at the temperature and pressure of use of at least about 0.001 equivalent per liter, preferably at least about 0.01 equivalent per liter, and more preferably at least about 0.1 equivalent per liter. As used herein, equivalents are calculated on the basis of a salt's ability to provide lithium cations, and the ability of non-lithium salts to combine with lithium cations on the basis of formal charge. For example, one mole of Li$_2$SO$_4$ is equal to two equivalents (two Li+ cations per molecule), and one mole of LiClO$_4$ is equal to one equivalent (one Li+ cation per molecule). Similarly, one mole of Mn(1,10-phenanthroline)$_3$(ClO$_4$)$_2$ is equal to two equivalents (two ClO$_4^-$ anions per molecule), and one mole of tetramethylammonium tetrafluoroborate is equal to one equivalent (one BF$_4^-$ anion per molecule).

In the practice of this invention, the solubility modifying additive is used in an amount which is effective to increase the solubility of a lithium salt in a non-aqueous solvent system which comprises a major portion of sulfur dioxide. Preferably, the amount of said solubility modifying additive is effective to at least double the solubility of the lithium salt in the solvent system. The use of one equivalent of solubility modifying additive in accordance with this invention can, in some cases, increase the solubility of a lithium salt in substantially pure sulfur dioxide by as much as a factor of 200 or more even when they share a common anion (see Example I).

Any lithium salt which does not react with the solvent system is suitable for use in the practice of this invention. However, lithium perchlorate, lithium dithionite, lithium sulfate, lithium tetrafluoroborate and lithium hexafluorophosphate are particularly preferred.

We have found that the method of this invention for enhancing the solubility of lithium salts in a sulfur dioxide-based solvent system is particularly useful for generating electrolytes for use in electrochemical cells which utilize an anode which comprises lithium. Such electrolytes are especially useful in an ambient temperature, rechargeable electrochemical cell which utilizes a lithium anode as an electrode of the second kind. Generally, electrodes of the second kind are considered to be those in which the potential determining ion in solution is in equilibrium with a solid salt phase. The activity and concentration of the potential determining ion in solution is controlled by this equilibrium.

An electrolyte prepared in accordance with the method of this invention is particularly well suited for use in an electrochemical cell having a lithium electrode of the second kind of the type which is set forth in copending U.S. patent application Ser. No. 471,429 (filed Mar. 2, 1983). This copending application, which is hereby incorporated in its entirety by reference, is directed to a rechargeable non-aqueous electrochemical cell which comprises a lithium anode, a cathode depolarizer, a positive electrode current collector, and an electrolyte comprising an ionizing solvent, a lithium salt, and a supporting electrolyte salt comprising at least one component of the general form $R^+X^-$, wherein $R^+$ is a cation other than that of lithium, and $X^-$ is an anion which forms a lithium salt which is less soluble in the cell than $R^+X^-$, and wherein the saturated concentration of lithium cation in the electrolyte is between about $10^{-9}$ and $10^{-1}$ equivalents per liter. Although the lithium cation concentration in the electrolyte of such a cell can vary over a wide range, optimum cell performance requires that the lithium cation concentration be optimized. Unfortunately, optimization of the lithium cation concentration in the electrolyte solution of such a cell has been very difficult in the past.

As used herein, the term "supporting electrolyte salt" refers to the primary conducting component in the electrolyte acting as the principal current carrier. While other conducting salts can be present, the supporting electrolyte salt is present in the highest concentration. Moreover, salts which have saturated concentrations between about $10^{-9}$ and about $10^{-1}$ equivalents per liter in the cell solution are referred to herein as "slightly soluble" salts. It should be understood that generic representation of ions (such as $R^+$ or $X^-$) refer to ions which can carry one or more positive or negative charges and are not intended, therefore, to denote only singly charged ions. References to cation solubility herein, generally speaking, refer to the solubility of salts containing the cation.

The present invention provides a highly satisfactory method for control of lithium salt solubility over a wide range of concentrations in a non-aqueous solvent system which comprises a major proportion of sulfur dioxide. In addition, such a solvent system is particularly satisfactory for use in an electrochemical cell of the type described above, since sulfur dioxide has an ability to form a passivating (yet ion conducting) film on lithium electrodes. Also advantageous is the fact that sulfur dioxide can perform the dual function of both solvent and cathode depolarizer. Thus, liquid sulfur dioxide is a very efficacious electrolyte component. It will be appreciated, of course, that a cathode depolarizer is an electrochemical couple wherein the oxidized form is reversibly reducible at the positive electrode, and $SO_2/S_2O_4^=$ represents such a couple. During discharge, the depolarizer is reduced at the positive electrode, and the process is reversed when the cell is charged. The $SO_2/S_2O_4^=$ couple is particularly satisfactory since the reduced form of the couple is soluble in a sulfur dioxide based solvent system. Such a system obviates any need for ultrahigh surface area positive electrodes.

As noted above, an electrolyte prepared in accordance with the method of this invention is particularly suitable for use in a rechargeable electrochemical cell having a lithium electrode of the second kind. Upon discharge, lithium cations ($Li^+$) are ejected from the anode and combine with anions ($X^-$), already present in relatively high concentration in the electrolyte solution, to form a slightly soluble lithium salt ($Li^+X^-$) which then precipitates onto the anode. At the positive electrode, the cathode depolarizer is reduced to a product which can be either soluble or insoluble in the electrolyte solution. When the cell is recharged, the slightly soluble lithium salt on the anode ($Li^+X^-$) is removed with the anion going back into solution and the lithium cations ($Li^+$) being reduced back to the metal at the anode. At the positive electrode, the reduction product is oxidized back to the original state of the cathode depolarizer.

Supporting electrolyte salts which are useful in an electrolyte solution for use in an electrochemical cell in accordance with this invention generally have a high conductivity in the electrolyte solvent system and, preferably, should be highly soluble. In addition, the electrolyte salt should also be substantially stable with respect to the other cell components. It will be appreciated, of course, that the solubility modifying additive of this invention can be utilized as the supporting electrolyte salt.

Suitable supporting electrolyte salts are of the general form $R^+X^-$ wherein said salt has no acidic hydrogen atoms which are capable of being abstracted by lithium metal. The cationic component, $R^+$, is a cation other than that of lithium and is preferably selected from the group consisting of metal cation complexes, quaternary ammonium cations, and organic phosphonium cations. Any of the cations which are suitable components of the previously defined solubility modifying additive are suitable for use as $R^+$.

The anionic component $X^-$ of said supporting electrolyte salt comprises any anion which combines with $Li^+$ to form a slightly soluble lithium salt, $Li^+X^-$, which is less soluble than $R^+X^-$ in the electrolyte solvent system and is stable at the positive electrode (except in those cases wherein the anion is the same as the reduction product formed at the positive electrode during discharge, such as $S_2O_4^=$ produced by reduction of $SO_2$). Suitable anions can be selected from the group consisting of halide, trihalide and oxyhalide anions; oxyacid, halide and organic anions of elements which are selected from Groups 3a, 4a, 5a and 6a of the Periodic Table [Handbook of Chemistry and Physics, 57th ed. (1976-77), p. B-4]; and anionic complexes of transition and rare earth metals. Examples of suitable anions include, but are not limited to perchlorate, dithionite, sulfate, fluoride, phosphate, tetrafluoroborate, and hexafluorophosphate. Perchlorate and dithionite ions are particularly preferred.

The supporting electrolyte salt should be sufficiently soluble in the electrolyte solvent system to produce a concentration which is between about 0.01 and about 5.0 equivalents per liter, and preferably between about 0.01 and about 4.0 equivalents per liter. For the preferred supporting electrolyte salts, this corresponds to molar concentrations between about 0.005 molar and about 5.0 molar, and preferably between about 0.005 and about 4.0 molar.

The electrolyte solution for use in an electrochemical cell in accordance with this invention is preferably saturated with respect to lithium cations. One method of achieving Li+ saturation or near saturation in solutions comprising a non-aqueous sulfur dioxide-based solvent system, at least one supporting electrolyte salt, and the solubility modifying additive of this invention involves adding the required amount of one or more lithium salts to the otherwise complete electrolyte solution. However, it will be appreciated that the various electrolyte solution components can be combined in any sequence.

In a rechargeable electrochemical cell having a lithium anode of the second kind, a high lithium cation concentration in the electrolyte solution can result in an asymmetric deposition of the anode metal during charge. Therefore, the electrolyte solution should be saturated with respect to lithium cations, but the concentration of lithium cations should also be as small as possible consistent with desirable current densities. Preferred concentration ranges can be estimated by considering planar and porous electrodes at practical charging densities. Assuming a planar anode with discharge product deposited on its surface, to achieve a charging current density of about 50 mA/cm$^2$, the lithium cation concentration should be about $10^{-1}$ equivalent per liter. Similarly, with porous electrodes, useful current densities can be achieved with lithium cation concentrations of about $10^{-9}$ equivalent per liter, and preferably between about $10^{-2}$ equivalent per liter and about $10^{-5}$ equivalent per liter. Accordingly, the saturated concentration of Li+ should be between about $10^{-9}$ and about $10^{-1}$ equivalent per liter, provided, however, that the saturated concentration of Li+ should always be less than the concentration of the supporting electrolyte salt.

The lithium anode metal of the electrochemical cell of this invention can be used in a variety of physical forms such as films, powders, compacts or screens, and can be used alone or in combination with either conducting or non-conducting substrates.

The positive electrode current collector of the electrochemical cell can be constructed of any material which is substantially inert to the cell components. Preferred materials are metals of the platinum group family including platinum, iridium, osmium, palladium, rhodium and ruthenium; carbon in any of its common electrode forms such as sintered, compacted, powdered or in rod form and alone or over platinum; iron in various forms, particularly as stainless steel; and titanium, nickel, silver, mercury, lead and gold. Less preferred materials are metals of the families of vanadium, chromium and manganese which are selected from Groups 5b, 6b and 7b of the Periodic Table [Handbook of Chemistry and Physics, 57th ed. (1976-77), p. B-4]; copper, zinc, cadnium, germanium, tin, antimony and bismuth; certain nitrides such as boron nitride; and semiconductors such as silicon-containing substrates. All of these materials can be used in any of the various forms which are conventional in the art such as rods, compacts, powders, pastes and the like.

The following examples are intended only to illustrate the invention and are not to be construed as imposing limitations on it.

EXAMPLE I

The effect of various non-lithium salts on the solubility in liquid sulfur dioxide of a series of lithium salts was evaluated in solubility cells which were constructed from 3.8 cm internal diameter Pyrex tubing which was fused shut at one end and sealed by a Teflon gasket to a stainless steel cap at the other end. A port was provided in the cap for evacuation, for loading the cell with sulfur dioxide, and for removing samples.

High purity sulfur dioxide was purchased commercially in cylinders which had been heated under vacuum prior to filling in order to minimize any possible contamination by water. The sulfur dioxide was further purified prior to use by storage over strips of lithium metal overnight followed by distillation. The various salts employed were dried overnight and under vacuum at a temperature in the range from about 100° to about 200° C. prior to use.

The cells were loaded with the desired salts in either a nitrogen or an argon filled dry box after which they were sealed, evacuated, and sulfur dioxide was distilled in. The contents were then vigorously stirred for at least 2 hours with a magnetic stirring bar. In each case, the resulting mixture was allowed to settle overnight, and the cell was then weighed. After settling for an additional 4 or 5 hours, a 5 to 15 ml sample of the resulting solution was withdrawn into a round-bottomed glass flask, and the solubility cell was then reweighed. Sulfur dioxide was evaporated from the sample under a flow of nitrogen while heating the sample at a temperature in the range from 80° to 100° C. The residue in the sample flask was then dissolved with an amount of water in the range from about 25 to 100 grams at a temperature of about 90° C. After cooling, the resulting aqueous solution was analyzed for lithium by atomic absorption spectroscopy. The Li+ concentration in the sulfur dioxide solution was then calculated, and the results are set forth in Tables I, II and III. The results which are set forth in the columns headed "Obsd." refer to the observed solubilities, and the results in the columns headed "Obsd./Calc." were derived by dividing the observed solubility by the calculated solubility. The calculated solubility used for this purpose was obtained by estimating a solubility product from the lithium salt solubility which was measured in the absence of any additive. All of the solubility measurements were carried out at room temperature (about 23° C.).

The results in Tables I, II and III demonstrate that tetrabutylammonium perchlorate, tetrahexylammonium perchlorate, Mn(2,2'-dipyridyl)$_3$(ClO$_4$)$_2$, Mn(1,10-phenanthroline)$_3$(ClO$_4$)$_2$, tetramethylammonium tetrafluoroborate, tetrabutylammonium tetrafluoroborate, and tetrapropylammonium hexafluorophosphate are able to exert an enormous effect on the solubility of the corresponding lithium salt having a common anion. For example, in the case of lithium tetrafluoroborate, the presence of 1000 milliequivalents per liter of tetrabutylammonium tetrafluoroborate serves to increase the measured lithium salt solubility by a factor of 220, and this solubility is greater than the calculated value by a factor of one million (see Table II). It will be appreciated, of course, that the presence of a common anion from another salt would be expected to depress the solubility of a lithium salt.

The data which are set forth in Tables I, II and III also demonstrate that the solubility of lithium salts in sulfur dioxide can be controlled over an extremely large range by the simple expedient of adding a salt which contains at least one cation selected from the group consisting of metal cation complexes and quaternary ammonium cations. In addition, the results in Tables I, II and III suggest that there is a size-of-cation effect in view of the diminishing solubility enhancement with cation size for TBAClO$_4$ vs. THAClO$_4$, TByMnClO$_4$ vs. TPhMnClO$_4$, and TMABF$_4$ vs. TBABF$_4$.

EXAMPLE II

A. Preparation of Supporting Electrolyte Salt

The general procedure for preparing Mn(2,2'-dipyridyl)$_3$(ClO$_4$)$_2$ was the following: 1000 ml of water were mixed with 1.70 g of MnSO$_4$·H$_2$O and 5.00 g of 2,2'-dipyridyl in a 2 liter beaker and heated to about 50° C. while stirring. After all ingredients had dissolved, about 5.28 g of LiClO$_4$ were added. Stirring was continued but the heat was turned off. As crystals began to form, nitrogen was blown over the solution to inhibit oxygen contact. The crystals were allowed to form until a usable quantity appeared on the bottom of the beaker (typically about 1–2 hours). The Mn(2,2'-dipyridyl)$_3$(ClO$_4$)$_2$ crystals were then filtered from the solution and dried under vacuum at about 150° C. for about 2–4 hours. [This procedure adapted from J. Inorg. Nucl. Chem. 9, 211(1959).]

B. Preparation of Purified SO$_2$

Sulfur dioxide was purchased commercially in cylinders that were specially "baked-out" prior to filling to prevent H$_2$O contamination. The sulfur dioxide in gaseous form at about 1.2–1.4 atm pressure was then passed through evacuated stainless steel tubing and a system of flow regulators and check valves into the bottom of a glass column containing glass wool impregnated with P$_2$O$_5$. The SO$_2$ was passed through the glass wool/P$_2$O$_5$ and then passed to a receiver tube maintained in an ice bath. Purified SO$_2$ condensed in the receiver tube. Approximately 200 ml of liquid SO$_2$ could be purified in approximately three hours. The purification system was periodically flushed with argon or nitrogen and evacuated with a vacuum pump.

TABLE I

| Additive Conc.[1] | LiClO$_4$ Solubility[1] (TBAClO$_4$ Additive[2]) | | LiClO$_4$ Solubility[1] (THAClO$_4$ Additive[3]) | | LiClO$_4$ Solubility[1] (TByMnClO$_4$ Additive[4]) | |
|---|---|---|---|---|---|---|
| | Obsd. | Obsd./Calc. | Obsd. | Obsd./Calc. | Obsd. | Obsd./Calc. |
| 0 | 1.4 | | 1.4 | | 1.4 | |
| 36 | | | | | 18 | $10^2$ |
| 130 | | | | | 59 | $10^3$ |
| 200 | 35 | $10^3$ | 28 | $10^3$ | | |
| 1000 | >200 | $10^5$ | | | | |

[1]Additive concentration and lithium salt solubility are expressed in milliequivalents per liter.
[2]Tetrabutylammonium perchlorate was used as the additive.
[3]Tetrahexylammonium perchlorate was used as the additive.
[4]Mn(2,2'-dipyridyl)$_3$(ClO$_4$)$_2$ was used as the additive.

TABLE II

| Additive Conc.[1] | LiClO$_4$ Solubility[1] (TPhMnClO$_4$ Additive[2]) | | LiBF$_4$ Solubility[1] (TMABF$_4$ Additive[3]) | | LiBF$_4$ Solubility[1] (TBABF$_4$ Additive[4]) | |
|---|---|---|---|---|---|---|
| | Obsd. | Obsd./Calc. | Obsd. | Obsd./Calc. | Obsd. | Obsd./Calc. |
| 0 | 1.4 | | 0.2 | | 0.2 | |
| 36 | 15 | $10^2$ | | | | |
| 200 | | | | | 2.3 | $10^4$ |
| 500 | | | 12 | $10^5$ | 7 | $10^5$ |
| 1000 | | | | | 44 | $10^6$ |

[1]Additive concentration and lithium salt solubility are expressed in milliequivalents per liter.
[2]Mn(1,10-phenanthroline)$_3$(ClO$_4$)$_2$ was used as the additive.
[3]Tetramethylammonium tetrafluoroborate was used as the additive.
[4]Tetrabutylammonium tetrafluoroborate was used as the additive.

TABLE III

| Additive Conc.[1] | LiPF$_6$ Solubility[1] (TPAPF$_6$ Additive[2]) | | LiF Solubility[1] (TEAF Additive[3]) | Li$_2$SO$_4$ Solubility[1] (TEASO$_4$ Additive[4]) |
|---|---|---|---|---|
| | Obsd. | Obsd./Calc. | Obsd. | Obsd. |
| 0 | 1.3 | | <0.1 | 0–0.02 |
| 500 | 22 | $10^4$ | <0.1 | |
| 1000 | 44 | $10^4$ | | 0.05–0.09 |

[1]Additive concentration and lithium salt solubility are expressed in milliequivalents per liter.
[2]Tetrapropylammonium hexafluorophosphate was used as an additive.
[3]Tetraethylammonium fluoride was used as the additive.
[4]Tetraethylammonium sulfate was used as the additive.

C. Preparation of Electrolyte Solution

About 1.83 grams of solid supporting electrolyte salt from Step A were placed in a pressurized glass "purifying cell". 198.5 grams of liquid SO$_2$ in the purifying receiver of Step B were then transferred under pressure (i.e., at the vapor pressure of SO$_2$ at ambient temperature to maintain the SO$_2$ at ambient and in liquid state) into the purifying cell. The solution in the purifying cell was then stirred until all solid material was dissolved. The purifying cell and battery cell were connected with the purifying cell directly above the battery cell. A valve between them allowed for transfer of the purifying cell solution into the battery cell. After being evacuated, the battery cell was filled under pressure from the purifying cell to a height which just covered the anode foil.

In subsequent Examples, additional lithium salt or supporting electrolyte salt was placed in the battery cell prior to filling as noted in Tables V and VII. It should be noted that the amount of lithium salt and supporting electrolyte salt actually in the battery cell during operation was somewhat less than the sum of the amounts added to the purifying and battery cells. Specifically, Tables V and VII indicate the amounts added to the purifying and battery cells individually, but it should be emphasized that not all of the $SO_2$ solution in the purifying cell was transferred to the battery cell. The actual amount of $SO_2/LiClO_4$ solution transferred in each Example is also listed in Tables V and VII.

D. Cell Construction and Operation

A 1.4 mil lithium foil was used as the anode. The lithium was supported in a polypropylene holder to impart rigidity and to protect the electrode from exposure to the liquid/vapor interface of the cell. In earlier work, it was observed that extensive corrosion of the foil took place at the liquid/vapor interface. As this caused mechanical failure in some cases, a polypropylene holder was devised which simultaneously shielded the electrode from contact with the interface and provided a means of connecting a 40 mil lithium lead-in to the foil electrode. The cell was filled until the holder was partially (about half) submerged. For maximum flexibility, a total of three electrodes were immersed in the solution: a lithium foil anode, a carbon reference, and a porous positive carbon current collector of 15% 30B Teflon and 85% Shawinigan Black (about 60 $m^2$ in surface area). In Examples III through IX, a fourth electrode, a lithium reference electrode, was also immersed in the cell solution.

The cell was pressurized at the vapor pressure of $SO_2$ at ambient temperature. A peculiarity of our cell design was that the electrode feedthroughs at the top cover of the cell were relatively close together. We discovered that $SO_2$ condensation on the underside of the cover sometimes caused shorts between electrodes. To prevent this condensation, the top cover was heated to about 35° C., but the cell itself and the cell solution were not heated.

For comparison purposes, the electrolyte of this cell was prepared without the use of a lithium salt. One complete cycle comprised a discharge period of approximately 30 minutes, about a 3 minute period at open circuit, and a charge period of about 30 minutes. Other relevant cell composition and performance details are contained in Tables IV and V.

The following notations were employed in Table IV and subsequent tables: $Mn(2,2'-dipyridyl)_3(ClO_4)_2$ supporting electrolyte salt is denoted $TByMnClO_4$; $Mn(1,10-phenanthroline)_3(ClO_4)_2$ is denoted $TPhMnClO_4$; the current densities listed are for both the charge and discharge portions of each cycle; "$LiClO_4$ Sat'n %" refers to the degree (percentage) of saturation brought about by the addition of the lithium salt to the electrolyte solution; and the efficiencies refer to plating efficiencies based upon the assumption that the only mechanism by which the amount of available lithium was reduced was partial irreversibility of discharge product formation.

As noted, the cell of Example II had no $LiClO_4$ added to it. In operation, the anode of this cell was observed to deteriorate rapidly—it began to corrode and dissolve after only a few cycles. The anode was almost completely consumed and cell breakdown occurred before one turnover.

EXAMPLES III-VI

The cells were constructed substantially in accord with the procedures of Example II with the following exceptions:

(1) An additional purification step was added in the preparation of purified $SO_2$. The gaseous $SO_2$ was first bubbled through a glass column containing glass wool and $H_2SO_4$ before proceeding to the glass wool/$P_2O_5$ column. This was intended to help remove $SO_3$.

(2) Lithium perchlorate was added to each cell to produce increasing $LiClO_4$ concentrations. Thus, a cell less than 100% saturated in $LiClO_4$ could be made by adjusting the concentration of a supporting electrolyte salt which provided additional perchlorate anion. Specifically, the cell of Example III was first saturated in $LiClO_4$. All excess undissolved $LiClO_4$ was then removed from the cell and sufficient supporting electrolyte salt was added to bring the $LiClO_4$ concentration to about 30% saturated. The cell of Example IV was approximately 100% saturated, but no solid excess $LiClO_4$ remained in the bottom of the cell. Accordingly, while enough $LiClO_4$ was added to the cell of Example IV to substantially saturate the solution, actual saturation could not be confirmed with certainty. Sufficient $LiClO_4$ was added to the cells of Examples V and VI to result in excess solid $LiClO_4$ in the bottom of the cell. The actual amounts of supporting electrolyte salt and $LiClO_4$ placed in the purifying cell and battery cell in each Example are noted in Table V.

(3) Each cell was stirred with a magnetic stirrer during operation.

Composition and performance details are listed in Tables IV and V.

EXAMPLE VII

A. Preparation of Supporting Electrolyte Salt

The general procedure for preparing $Mn(1,10-phenanthroline)_3(ClO_4)_2$ was the following: 1000 ml of water were mixed with 1.70 g of $MnSO_4 \cdot H_2O$ and 6.00 g of $1,10$-phenanthroline$\cdot H_2O$ in a 2 liter beaker and heated to about 50° C. while stirring. After all ingredients had dissolved, 2.20 g of $LiClO_4$ were added. Stirring was continued but the heat was turned off. As crystals began to form, nitrogen was blown over the solution.

The $Mn(1,10-phenanthroline)_3(ClO_4)_2$ crystals were filtered, collected and dried in vacuum at about 180° C. for 2-4 hours. [This procedure adapted from J. Inorg. Nucl. Chem. 9, 211 (1959).]

All other aspects of the cell were substantially identical to Example II. For comparison purposes, no $LiClO_4$ was added to the electrolyte. Composition and performance details are contained in Tables VI and VII.

EXAMPLES VIII AND IX

The supporting electrolyte salts were prepared as in Example VII. All other aspects of Example IX were prepared in accord with Examples III-VI.

For Example VIII, however, a solution less than 100% saturated in $LiClO_4$ was prepared substantially in accord with the method employed in Example III (i.e., saturation first, followed by unsaturation through the addition of supporting electrolyte salt which provided additional perchlorate anion). Further, an additional $SO_2$ purification step was performed. After leaving the acid and $P_2O_5$ purifying columns, the liquid $SO_2$ was routed to a vessel containing strips of lithium foil and pressurized at the vapor pressure of $SO_2$ at ambient. The liquid $SO_2$ was kept in the lithium-containing vessel for at least overnight prior to use. This step was expected to help remove any impurities that were reactive with lithium.

Composition and performance details are contained in Tables VI and VII.

TABLE IV

| | Example | | | | |
|---|---|---|---|---|---|
| | II | III | IV | V | VI |
| TByMnClO4 Conc., eq/l[1] | 0.036 | 0.13 | 0.042 | 0.056 | 0.048 |
| LiClO4 Conc., eq/l | 0 | 0.018 | 0.018 | 0.018 | 0.018 |
| LiClO4 Sat'n % | 0 | ~30 | ~100 | 100 | 100 |
| No. of Cycles | 13 | 83 | 210 | 269 | 210 |
| No. of Li Turnovers | <1 | 3.5 | 9.0 | 11.6 | 10.5 |
| Efficiency, % | — | 71.1 | 88.9 | 91.4 | 90.5 |
| Initial OCV, v | 3.17 | 3.03 | 2.95 | 2.92 | 2.92 |
| Mid-cycle OCV, v | 2.9 | 2.92 | 2.97 | 2.94 | 3.01 |
| Current Density, $\mu A/cm^2$ | 50 | 475 | 475 | 475 | 475 |
| ½ Cycle Length, min. | 30 | 30 | 30 | 30 | 30 |
| Forming Discharge Length, min. | 3 | 3.3 | 3.6 | 3.7 | 5.3 |
| % Change in Solution Resist. | −9 | +9 | — | — | +8 |

[1]TByMnClO4 refers to $Mn(2,2'-dipyridyl)_3(ClO_4)_2$.

TABLE V

| Electrolyte Component[2] | Electrolyte Composition | | | | |
|---|---|---|---|---|---|
| | Example[1] | | | | |
| | II | III | IV | V | VI |
| TByMnClO4 | | | | | |
| Total Weight | 1.83 | 2.95 | 1.45 | 1.44 | 1.44 |
| In Purifying Cell | 1.83 | 1.45 | 1.45 | 1.44 | 1.44 |
| In Battery Cell | 0 | 1.50 | 0 | 0 | 0 |
| LiClO4 | | | | | |
| Total Weight | 0 | 0.402 | 0.200 | 0.503 | 0.802 |
| In Purifying Cell | 0 | 0.402 | 0.099 | 0.401 | 0.401 |
| In Battery Cell | 0 | 0 | 0.101 | 0.102 | 0.401 |
| SO2 | | | | | |
| In Purifying Cell | 198.5 | 125.2 | 132.4 | 101.1 | 117.4 |
| Transferred to Battery Cell | | 66.2 | 70.4 | 58.1 | 75.5 |

[1]The amounts of each electrolyte component are expressed in grams.
[2]TByMnClO4 refers to $Mn(2,2'-dipyridyl)_3(ClO_4)_2$.

EXAMPLE X

The general procedures for cells employing tetra-n-butyl ammonium perchlorate (TBAClO4) as the supporting electrolyte salt were the following:

A. Electrolyte Preparation

"Electrometric grade" TBAClO4 was purchased commercially and vacuum dried for at least three days. For two of the three days, the TBAClO4 was heated over a boiling water bath. The dried TBAClO4 was kept stored in an argon glove box.

Lithium perchlorate was dried on a vacuum rack with a diffusion pump for at least three days at about 130° C. Afterwards, the LiClO4 was kept in an argon glove box. The moisture content of the TBAClO4 and LiClO4 was measured to be less than 150 ppm.

About 3.76 g TBAClO4 and 0.9 g of LiClO4 were placed in an electrolyte container in the glove box. The container was connected to an $SO_2$ distillation line and slowly evacuated. During evacuation, the container was immersed in an isopropanol-dry ice bath and brought to about −50° C.

The line between the container and the $SO_2$ distillation rack was evacuated. Gaseous $SO_2$ was then bubbled through a concentrated $H_2SO_4$ bath at less than 1 atm. and routed through a $P_2O_5$ drying column and into the electrolyte container. The electrolyte container was brought to and maintained at about −60° C. during distillation. The $SO_2$ was shut off with about 60 ml of $SO_2$ in the electrolyte container. The resulting TBA-ClO4 concentration was about 0.18 eq/l.

TABLE VI

| | Example | | |
|---|---|---|---|
| | VII | VIII | IX |
| TPhMnClO4 Conc., eq/l | 0.038 | 0.14 | 0.038 |
| LiClO4 Conc., eq/l | 0 | 0.015 | 0.015 |
| LiClO4 Sat'n % | 0 | ~40 | 100 |
| No. of Cycles | 64 | 78 | 187 |
| No. of Li Turnovers | <1 | 3.6 | 8.1 |
| Efficiency, % | — | 72.3 | 87.6 |
| Initial OCV, v | 3.07 | 3.01 | 2.91 |
| Mid-cycle OCV, v | 2.85 | 2.98 | 2.98 |
| Current Density, $\mu A/cm^2$ | 50 | 475 | 475 |
| ½ Cycle Length, min. | 30 | 30 | 30 |
| Forming Discharge Length, hrs. | 4.7 | 4.5 | 3.7 |
| % Change in Solution Resist. | — | −7 | +10 |

[1]TPhMnClO4 refers to $Mn(1,10-phenanthroline)_3(ClO_4)_2$.

TABLE VII

| Electrolyte Component[2] | Electrolyte Composition | | |
|---|---|---|---|
| | Example[1] | | |
| | VII | VIII | IX |
| TPhMnClO4 | | | |
| Total Weight | 2.09 | 3.09 | 1.21 |
| In Purifying Cell | 2.09 | 1.58 | 1.21 |
| In Battery Cell | 0 | 1.51 | 0 |
| LiClO4 | | | |
| Total Weight | 0 | 0.404 | 0.802 |
| In Purifying Cell | 0 | 0.404 | 0.402 |
| In Battery Cell | 0 | 0 | 0.400 |
| SO2 | | | |
| In Purifying Cell | 189.1 | 114.7 | 115.2 |
| Transferred to Battery Cell | | 57.8 | 60.2 |

[1]The amounts of each electrolyte component are expressed in grams.
[2]TPhMnClO4 refers to $Mn(1,10-phenanthroline)_3(ClO_4)_2$.

B. Electrode Preparation

Five to ten glass slides were washed, scrubbed with Chem-solv, and thoroughly rinsed. About ½ inch length of commercial lithium foil was then placed in a molybdenum container in preparation for vacuum vapor deposition of a thin lithium film on a clean glass slide. Deposition was carried out at about $10^{-6}$ mbar vacuum in an Edwards Co. vacuum deposition apparatus (Model E 306A) for about 30 to 60 minutes. Obviously, film thickness was dependent upon deposition time. The deposition time for each electrode was determined by trial and error—very short times yielded films that were too thin for good cell performance. After deposition was complete, the slide was exposed to a mixture of oxygen and argon for about 20 minutes at a pressure of about 0.34 atm.

The resulting glass slide coated with a thin lithium film was then wrapped at one end with a 0.01 inch thick lithium ribbon, followed by a nickel ribbon to act as a tab connector. The slide was then dipped in wax until both ends were covered with wax, leaving a rectangle of lithium film about 1.5×2.5 cm in size left exposed.

C. Cell Assembly

It should be stressed that cleanliness was essential. Clean, dry latex gloves (washed well with soap and water and rinsed with ethanol) and filter masks were used at all times in assembling the cell and handling the glass slide anode. Care was also taken to avoid cross contamination due to unclean tools or improper washing. All assembly was performed in a dry room (less than 1% relative humidity).

The lithium anode, carbon current collector and any reference electrodes that were used were inserted into stainless steel feedthroughs in the polypropylene top of a glass cell cylinder. A stainless steel fill tube extended through the top of the cell to beneath the electrolyte level. The electrolyte container and cell were then connected, and the connecting line between them was repeatedly evacuated and flushed with argon. The valve between the electrolyte container and the cell was slowly opened to transfer the electrolyte into the cell. When all of the exposed portion of the lithium film on the anode was covered with electrolyte, the filling was complete.

It should be noted that no stirring of the electrolyte or cell was done to dissolve the $LiClO_4$ salt. In this example, two lithium electrodes on glass slides were prepared simultaneously. The $SO_2/TBAClO_4$ electrolyte was prepared about 3 days prior to use. During operation, both lithium electrodes and a carbon (15% Teflon 7C, 85% Shawinigan Black) electrode were inserted into the electrolyte. The cell was then cycled through numerous charge discharge cycles with each lithium electrode being cycled versus the other lithium electrode. The carbon electrode was used only as a reference electrode against which the open circuit voltage (OCV) measurements were taken.

Composition and performance details of this cell are contained in Table VIII. The same assumptions and definitions regarding efficiency and turnovers made in Tables IV and VI also pertain to Table VIII.

EXAMPLE XI

The cell components were prepared in accord with the method of Example X. 4.1 g of $TBAClO_4$ and 0.32 g of $LiClO_4$ were added to 60 ml of $SO_2$ to form the electrolyte in the electrolyte container. About 0.5 g of additional $LiClO_4$ was added to the battery cell prior to filling. Sufficient $LiClO_4$ was present in the cell to substantially saturate the cell solution. The electrolyte was mechanically stirred for about 63 hours prior to filling the cell, but the cell itself was not stirred after filling. One lithium anode on glass and two carbon electrodes were inserted into the cell. All cycling was done between the lithium anode and a carbon current collector. After 246 cycles, the cell failed from deterioration of the lithium anode. Composition and performance details are summarized in Table VIII.

EXAMPLE XII

The cell components were prepared in accord with the method of Example X. 6.84 g of $TBAClO_4$ and 1.5 g of $LiClO_4$ were added to 100 ml of $SO_2$ in the electrolyte container to form the electrolyte. No additional $LiClO_4$ was added to the cell. Sufficient $LiClO_4$ was present in the cell to substantially saturate the cell solution. The electrolyte was ultrasonically stirred for about 1 hour prior to filling the cell and the ultrasonic stirring was continued during cycling. To compensate for heating effects caused by the ultrasonic stirring, the cell was maintained in a cooling bath at about 20° C. All cycling was performed between the lithium anode and a carbon current collector. After 456 cycles, the cell failed from deterioration of the anode. Composition and performance details are summarized in Table VIII.

EXAMPLE XIII

The cell components were prepared in accord with the method of Example X. 2.73 g of $TBAClO_4$ and 0.11 g of $LiClO_4$ were added to 40 ml of $SO_2$ in the electrolyte container to form the electrolyte. No additional $LiClO_4$ was added to the cell. For comparison purposes, the quantity of $LiClO_4$ present was not sufficient to saturate the cell solution. The electrolyte was mechanically stirred for about 20 hours prior to filling the cell; the cell itself was not stirred after filling. All cycles were performed between the lithium anode and a carbon current collector. As expected, the unsaturated electrolyte performed poorly—the cell failed due to deterioration of the anode after 104 cycles (less than one turnover). Composition and performance details are summarized in Table VIII.

Some observations are noteworthy. In general, cells unsaturated in lithium perchlorate failed more rapidly than saturated cells—although some cycling was accomplished. In addition, it appears that Examples XI and XII did not perform as well as Example X, although all three were substantially saturated in $LiClO_4$.

The degraded performance of Examples XI and XII is believed to be due to the presence of water. Measurements performed after the cells failed indicate that the $LiClO_4$ used in these cells contained about 274 ppm of $H_2O$. This water, when combined with estimates of the water content of the $TBAClO_4$ and $SO_2$, yields an estimate of about $2.5\times10^{-5}$ moles of $H_2O$ in the electrolyte. As the lithium electrode typically contained about $4\times10^{-5}$ moles of lithium, water content on the order of $10^{-5}$ moles could cause significant loss of lithium from the surface of the anode.

In addition, as previously noted, increasing the concentration of the perchlorate supporting electrolyte salt served to increase the saturated concentration of the lithium perchlorate. As both salts have the same anion, this result is anomalous and is not fully understood. Nevertheless, this effect can be utilized to adjust the solubility of the lithium perchlorate. In short, it is possible to adjust the saturated concentration of the lithium perchlorate through an adjustment of the perchlorate supporting electrolyte salt concentration.

TABLE VIII

|  | Example | | | |
| --- | --- | --- | --- | --- |
|  | X | XI | XII | XIII |
| $TBAClO_4$ Conc., eq/l[1] | 0.18 | 0.20 | 0.20 | 0.20 |
| $LiClO_4$ Conc., eq/l | 0.035 | 0.035 | 0.035 | 0.025 |
| $LiClO_4$ Sat'n % | 100 | 100 | 100 | ~70 |
| No. of Cycles | 1,785 | 246 | 456 | 104 |
| No. of Li Turnovers | ~30 | 2.73 | 2.98 | 0.85 |
| Efficiency, % | 97.2 | 81.9 | 83.2 | 40.8 |
| Initial OCV, v | 3.11 | 3.02 | 2.99 | 2.99 |
| Mid-Test OCV, v | 3.15 | 3.27 | 3.03 | None |
| (after No. cycles) | (836) | (127) | (260) |  |
| Current Density, $\mu A/cm^2$ | ~12 | 14 | 14 | 11 |
| ½ Cycle Length, min. | 10 | 10 | 10 | 10 |
| Forming Discharge Length, min. | 20 | 20 | 20 | 20 |

TABLE VIII-continued

| | Example | | | |
|---|---|---|---|---|
| | X | XI | XII | XIII |
| Stirred: | | | | |
| Electrolyte | No | Yes | Yes | Yes |
| Cell | No | No | Yes | No |

[1]TBAClO4 refers to tetrabutylammonium perchlorate.

We claim:

1. A method for modifying the solubility of a lithium salt in a non-aqueous solvent system which comprises dissolving said lithium salt and a solubility modifying additive in the solvent system, wherein said solvent system comprises a major portion of sulfur dioxide, the amount of said lithium salt is in excess of the amount which is soluble in the solvent system in the absence of said solubility modifying additive, the amount of said solubility modifying additive is effective to increase the solubility of the lithium salt, and said solubility modifying additive comprises a salt which contains at least one cation selected from the group consisting of metal cation complexes, quaternary ammonium cations and organic phosphonium cations.

2. The method as set forth in claim 1 wherein the amount of said lithium salt is effective to substantially saturate the solvent system in the presence of said solubility modifying additive.

3. The method as set forth in claim 1 wherein the amount of said solubility modifying additive is effective to at least double the solubility of said lithium salt.

4. The method as set forth in claim 1 wherein said solvent system is substantially pure sulfur dioxide.

5. The method as set forth in claim 1 wherein said solubility modifying additive has a solubility in said solvent system at the temperature and pressure of use of at least about 0.1 equivalent per liter.

6. The method as set forth in claim 1 wherein said lithium salt and said solubility modifying additive contain a common anion.

7. The method as set forth in claim 1 wherein said cation is selected from the group consisting of $Mn(2,2'\text{-dipyridyl})_3^{++}$ and $Mn(1,10\text{-phenanthroline})_3^{++}$.

8. The method as set forth in claim 1 wherein said solubility modifying additive is a quaternary ammonium salt of the formula:

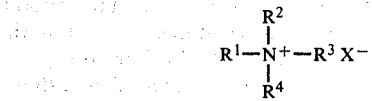

wherein $R^1$, $R^2$, $R^3$ and $R^4$ are independently selected from the group consisting of hydrocarbyl groups of from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

9. The method as set forth in claim 8 wherein $R^1$, $R^2$, $R^3$ and $R^4$ are independently selected from the group consisting of alkyl groups of from 1 to 10 carbon atoms, and $X^-$ is selected from the group consisting of perchlorate, tetrafluoroborate, hexafluorophosphate, dithionite and sulfate.

10. The method as set forth in claim 1 wherein said solubility modifying additive is a phosphonium salt of the formula:

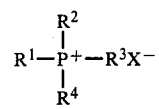

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

11. The method as set forth in claim 1 wherein said lithium salt is selected from the group consisting of lithium perchlorate, lithium dithionite, lithium sulfate, lithium tetrafluoroborate, and lithium hexafluorophosphate.

12. The composition prepared by the process which comprises dissolving a lithium salt and a solubility modifying additive in a non-aqueous solvent system, wherein said solvent system comprises a major portion of sulfur dioxide, the amount of said lithium salt is in excess of the amount which is soluble in the solvent system in the absence of said solubility modifying additive, the amount of said solubility modifying additive is effective to increase the solubility of the lithium salt, and said solubility modifying additive comprises a salt which contains at least one cation selected from the group consisting of metal cation complexes, quaternary ammonium cations and organic phosphonium cations.

13. The composition as set forth in claim 12 wherein the amount of said lithium salt is effective to substantially saturate the solvent system in the presence of said solubility modifying additive.

14. The composition as set forth in claim 12 wherein the amount of said solubility modifying additive is effective to at least double the solubility of said lithium salt.

15. The composition as set forth in claim 12 wherein said solvent system is substantially pure sulfur dioxide.

16. The composition as set forth in claim 12 wherein said cation is selected from the group consisting of $Mn(2,2'\text{-dipyridyl})_3^{++}$ and $Mn(1,10\text{-phenanthroline})_3^{++}$.

17. The composition as set forth in claim 12 wherein said solubility modifying additive is a quaternary ammonium salt of the formula:

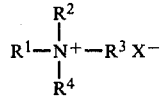

wherein $R^1$, $R^2$, $R^3$ and $R^4$ are independently selected from the group consisting of hydrocarbyl groups of from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

18. The composition as set forth in claim 12 wherein said solubility modifying additive is a phosphonium salt of the formula:

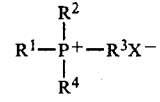

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

19. The composition as set forth in claim 12 wherein said lithium salt is selected from the group consisting of lithium perchlorate, lithium dithionite, lithium tetrafluoroborate, and lithium hexafluorophosphate.

20. An electrochemical cell comprising:
 (a) a lithium anode;
 (b) a positive electrode current collector; and
 (c) an electrolyte which comprises the composition of claim 12.

* * * * *

UNITED STATES PATENT OFFICE
CERTIFICATE OF CORRECTION

Patent No. 4,482,616　　　　　　　　　　Dated November 13, 1984

Inventor(s) John F. Connolly and Robert J. Thrash

It is certified that error appears in the above-identified patent and that said Letters Patent are hereby corrected as shown below:

Column 5, line 6, "2,2-dimethyoxypropane" should read --2,2-dimethoxypropane--.

Column 5, lines 47-52, the formula should appear as follows:

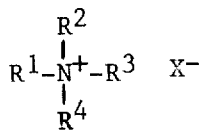

$$R^1-\overset{\overset{R^2}{|}}{\underset{\underset{R^4}{|}}{N^+}}-R^3 \quad X^-$$

Column 12, line 23, "Additive$_4$" should read --Additive$^4$--.

Signed and Sealed this

Twenty-fifth  Day of  June 1985

[SEAL]

Attest:

DONALD J. QUIGG

Attesting Officer　　Acting Commissioner of Patents and Trademarks